United States Patent
Lin et al.

(10) Patent No.: US 7,811,106 B2
(45) Date of Patent: Oct. 12, 2010

(54) CARD CONNECTOR

(75) Inventors: Kuo-Lung Lin, Tu-Cheng (TW);
Lai-Ang Hu, Kunshan (CN); Zhi-Jian Chen, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/380,685

(22) Filed: Mar. 2, 2009

(65) Prior Publication Data
US 2009/0305567 A1   Dec. 10, 2009

(30) Foreign Application Priority Data
Jun. 10, 2008   (TW) .............................. 97210222 U

(51) Int. Cl.
*H01R 13/62* (2006.01)
(52) U.S. Cl. ..................................... 439/159
(58) Field of Classification Search ................. 439/159, 439/157, 158
See application file for complete search history.

(56) References Cited

U.S. PATENT DOCUMENTS

| | | | | |
|---|---|---|---|---|
| 5,899,763 | A * | 5/1999 | Kajiura | 439/159 |
| 6,017,230 | A * | 1/2000 | Yao | 439/159 |
| 6,022,228 | A * | 2/2000 | Kuo | 439/159 |
| 6,027,350 | A | 2/2000 | Chen et al. | |
| 6,102,719 | A * | 8/2000 | Tung | 439/159 |
| 6,116,929 | A * | 9/2000 | Muramatsu | 439/159 |
| 6,120,309 | A * | 9/2000 | Hara | 439/159 |
| 6,162,075 | A * | 12/2000 | Hara et al. | 439/159 |
| 6,174,181 | B1 * | 1/2001 | Lai | 439/159 |
| 6,200,148 | B1 * | 3/2001 | Yu | 439/159 |
| 6,210,188 | B1 * | 4/2001 | Chang | 439/159 |
| 6,290,136 | B1 * | 9/2001 | Koseki et al. | 235/475 |
| 6,364,674 | B1 * | 4/2002 | Kajiura | 439/159 |
| 6,413,106 | B1 * | 7/2002 | Yu | 439/159 |
| 6,619,971 | B1 * | 9/2003 | Chen | 439/159 |
| 6,652,301 | B2 * | 11/2003 | Harasawa et al. | 439/159 |
| 6,739,890 | B2 * | 5/2004 | Hirata et al. | 439/159 |
| 6,796,816 | B2 * | 9/2004 | He | 439/159 |
| 6,857,886 | B2 * | 2/2005 | Lai et al. | 439/159 |
| 2003/0124890 | A1 * | 7/2003 | Harasawa et al. | 439/159 |
| 2004/0038570 | A1 * | 2/2004 | He | 439/159 |
| 2004/0067668 | A1 * | 4/2004 | Hirata et al. | 439/159 |
| 2004/0235325 | A1 * | 11/2004 | Iijima | 439/159 |
| 2005/0142913 | A1 * | 6/2005 | Cheng | 439/159 |

* cited by examiner

*Primary Examiner*—T C Patel
*Assistant Examiner*—Vladimir Imas
(74) *Attorney, Agent, or Firm*—Andrew C. Cheng; Wei Te Chung; Ming Chieh Chang

(57) ABSTRACT

A card connector comprises an insulating housing having contact receiving slots. An engaging portion is formed on a side of the housing and has a first fixing position and a second fixing position. A plurality of terminals is received in the receiving slots. An ejector comprises a card ejecting plate assembled to the housing and a push bar movable disposed on the engaging portion of the housing and connected with the card ejecting plate. A fixing portion is formed on an internal side of the push bar. The push bar drives the card ejecting plate to move between a card receiving position wherein the fixing portion is located at the first fixing position and a card ejected position wherein the fixing portion is located at the second fixing position.

8 Claims, 6 Drawing Sheets

CARD CONNECTOR

BACKGROUND OF THE INVENTION

1. Field of the Invention

The present invention relates to a card connector, and particularly to a SIM (Subscriber Identity Module) card connector comprising a card ejector facilitating quick and efficient withdrawal of inserted SIM card.

2. Description of Prior Arts

SIM card is widely used in mobile devices, especially in handsets. "Migratory Bird" (that is working in city, living in countryside) would like to switch his handset between two standby modules as he shuffles between two locations. If his handset does not install two SIM cards and work simultaneously, he has to push an inserted SIM card out and insert another SIM card. The SIM card is too small to be easily pushed out from the card connector. As a result the handset manufacturers have designed some card ejectors in the connector for pull out SIM fluently.

A typical SIM card connector with card ejector structure is described in U.S. Pat. No. 6,027,350 issued to Chen et al. on Feb. 22, 2000. The ejector 31 is used to push the SIM card out of the connector, but in this invention, the ejector is not engaged in the connector stably. When the card is pushed out, the ejector will tend to swing in the connector and be easy to be damaged.

Therefore, the present invention is directed to solving the problem by providing a card connector which has a special ejector structure.

SUMMARY OF THE INVENTION

The invention is to provide a SIM card connector having an ejector engaged in the connector steadily.

In the exemplary embodiment of the invention, a card connector comprises an insulating housing having contact receiving slots. An engaging portion is formed on a side of the housing and has a first fixing position and a second fixing position. A plurality of terminals is received in the receiving slots. An ejector comprises a card ejecting plate assembled to the housing and a push bar movably disposed on the engaging portion of the housing and connected with the card ejecting plate. A fixing portion is formed on an internal side of the push bar. The push bar drives the card ejecting plate to move between a card receiving position wherein the fixing portion is located at the first fixing position and a card ejected position wherein the fixing portion is located at the second fixing position.

Other objects, advantages and novel features of the invention will become more apparent from the following detailed description of the present embodiment when taken in conjunction with the accompanying drawings.

BRIEF DESCRIPTION OF THE DRAWING

FIG. 3 is a perspective view of the card connector according to the present invention with an ejector being pushed in;

DETAILED DESCRIPTION OF THE PREFERRED EMBODIMENT

Figure 1:
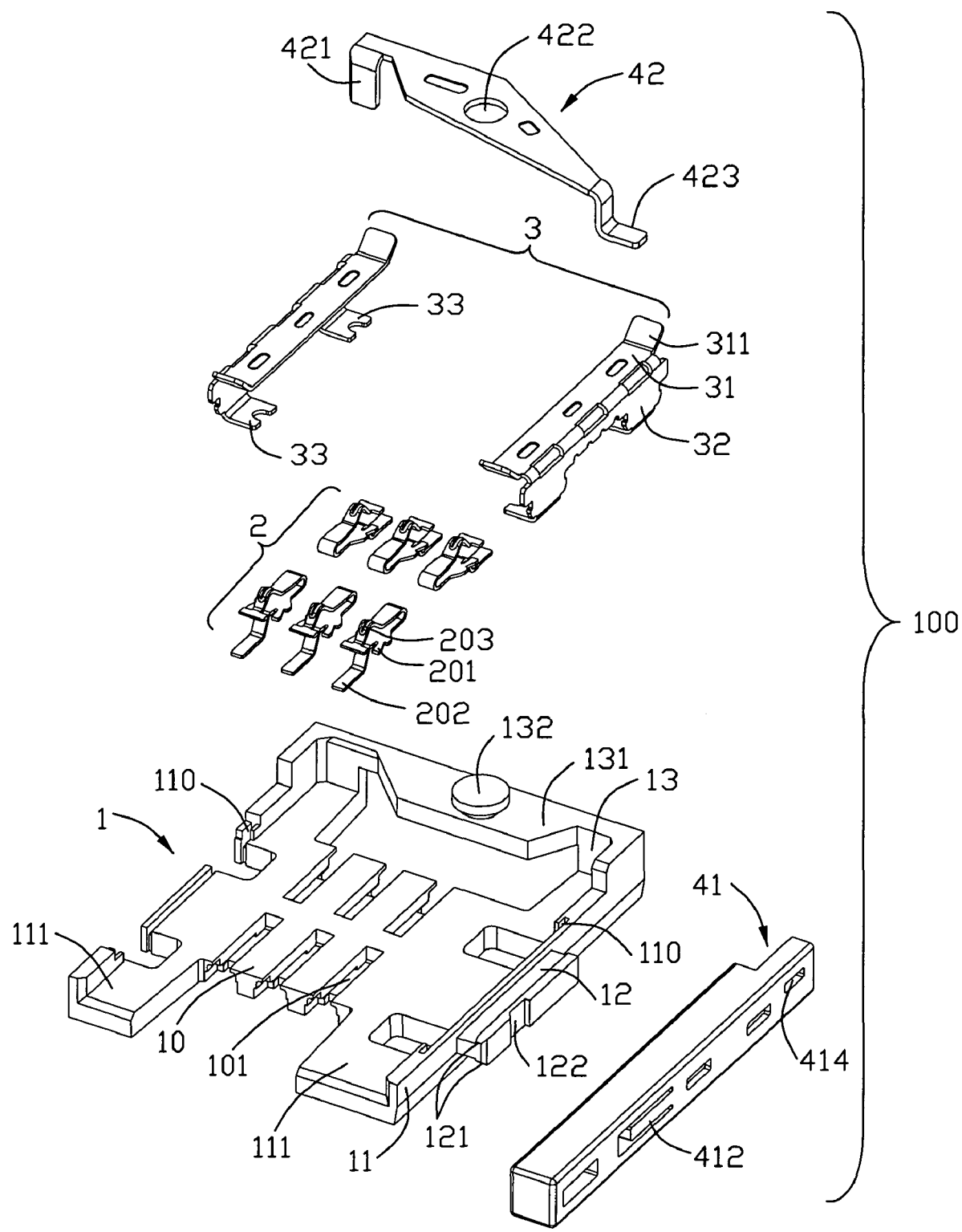
FIG. 1 is an exploded view of a card connector according to the present invention.
Figure 2:
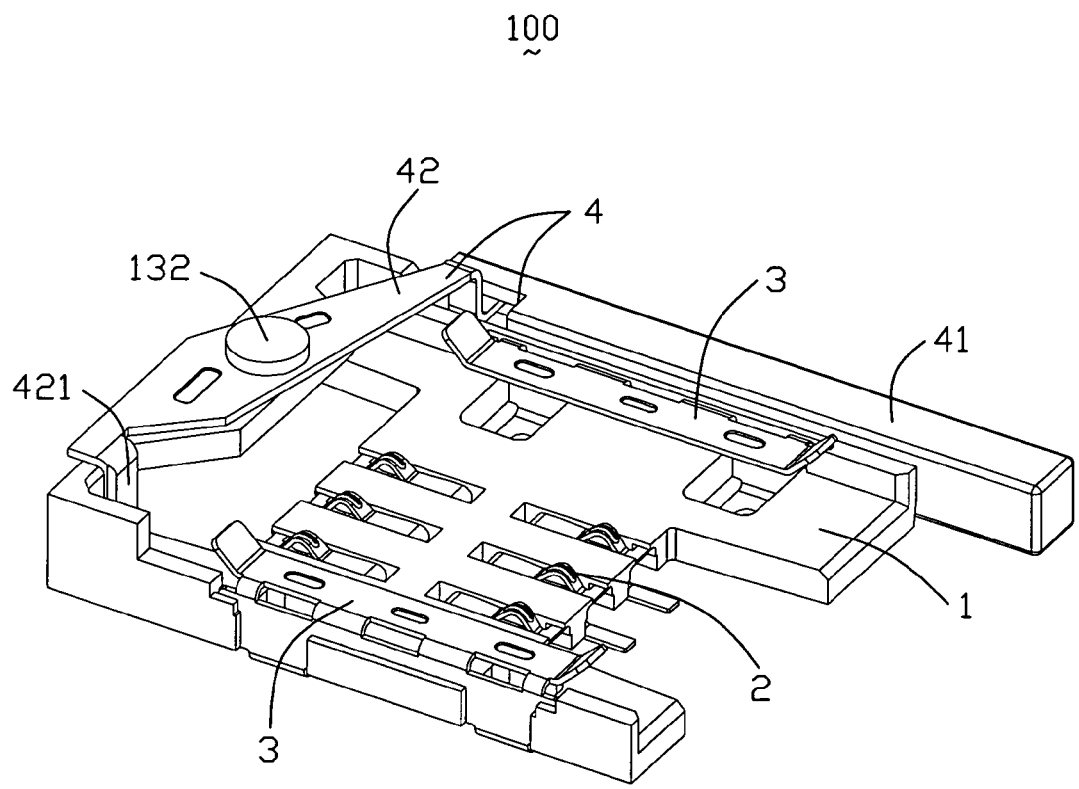
FIG. 2 is a perspective view of the card connector according to the present invention with an ejector being pulled out.
Figure 3:
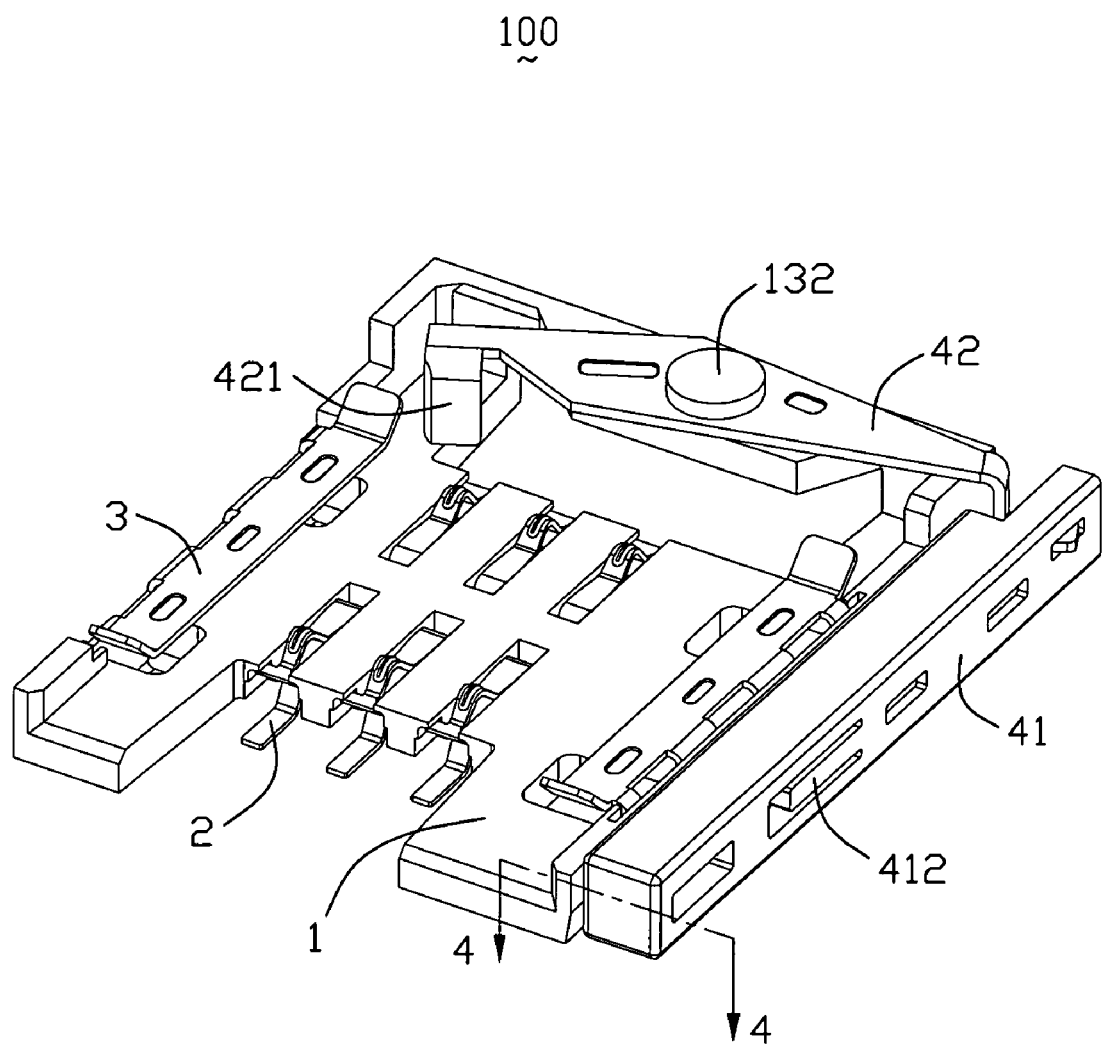

Referring to FIG. 1 and FIG. 2, the present invention provides a SIM card connector 100 comprising an insulative housing 1, a plurality of contacts 2, a pair of shells 3 and an ejector 4. The housing 1 has a base plane 10 with a guiding portion 111 formed in a front portion, two rows of contact receiving passages 101 formed in a front portion and a back portion of the base respectively. A pair of side walls 11 and a back wall 13 extends vertically from the base portion from two sides and a back side. A trapezoidal planar 131 extends frontwardly from an upside of the back wall. A pivot portion 132 is formed on the trapezoidal planar 131. The pivot portion 132 has a cylindrical shaft with a flange on the top. A pair of slots 110 is formed in a meddle side of each side wall which provide a pair of shell receiving portion. An engaging portion 12 extends outwardly from a side of the housing and is formed in T-shape, a first fixing portion 121 is formed in a front end of the engaging portion 12 and a second fixing portion 122 is a concave formed in a side of the engaging portion.

Each contact 2 is received in a corresponding receiving passages 101. Each contact 2 has an elongate base portion with anchoring portions 201 formed on two sides. A connecting portion extends downwardly at an inclination direction and a solder portion 202 extends backwardly from the connecting portion. A C-shaped curve portion connects with the base portion with a cantilever elastic contacting portion 203 extending backwardly. Each shell 3 has a planar card pressing portion 31. Two ends 311 of the pressing portion 31 are tilted upwardly for guiding the card. A connecting portion 32 extends downwardly from the pressing portion 211. And two solder portions 33 are extending inwardly from the connecting portion 32. The shells are received in the slots 110 of the housing 1 with the solder portions 33 extending into the bottom of the housing for being soldered on a PCB. A card receiving space is formed be the base portion 10 of the housing 1 and the pressing portion 31 of the shell 1. The shell 3 is engaged in an appropriate position that the card will be clamped by the housing 1 and the shell 3 firmly.

The ejector 4 comprises a lever 42 and a push bar 41. The lever 42 mounted on the planar portion 131 with a through hole 422 passed through the pivot portion 132, an ejecting plate 421 extends downwardly from an end of the lever 42 and a connecting portion 423 extends offset from the other end of the lever 42.

Figure 4:
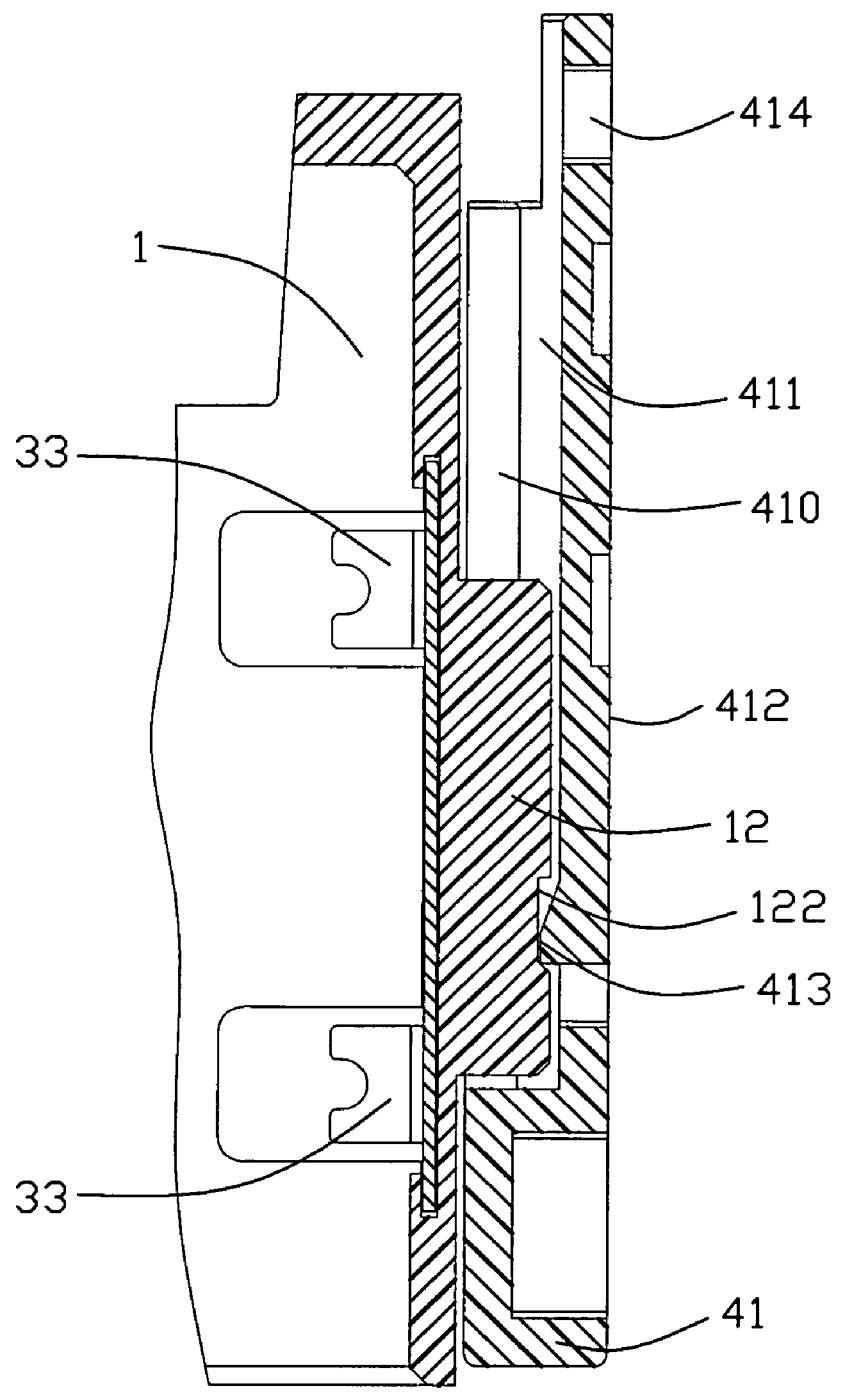
FIG. 4 is a cross-section view of the card connector alone line 4-4 of FIG. 3.
Figure 5:
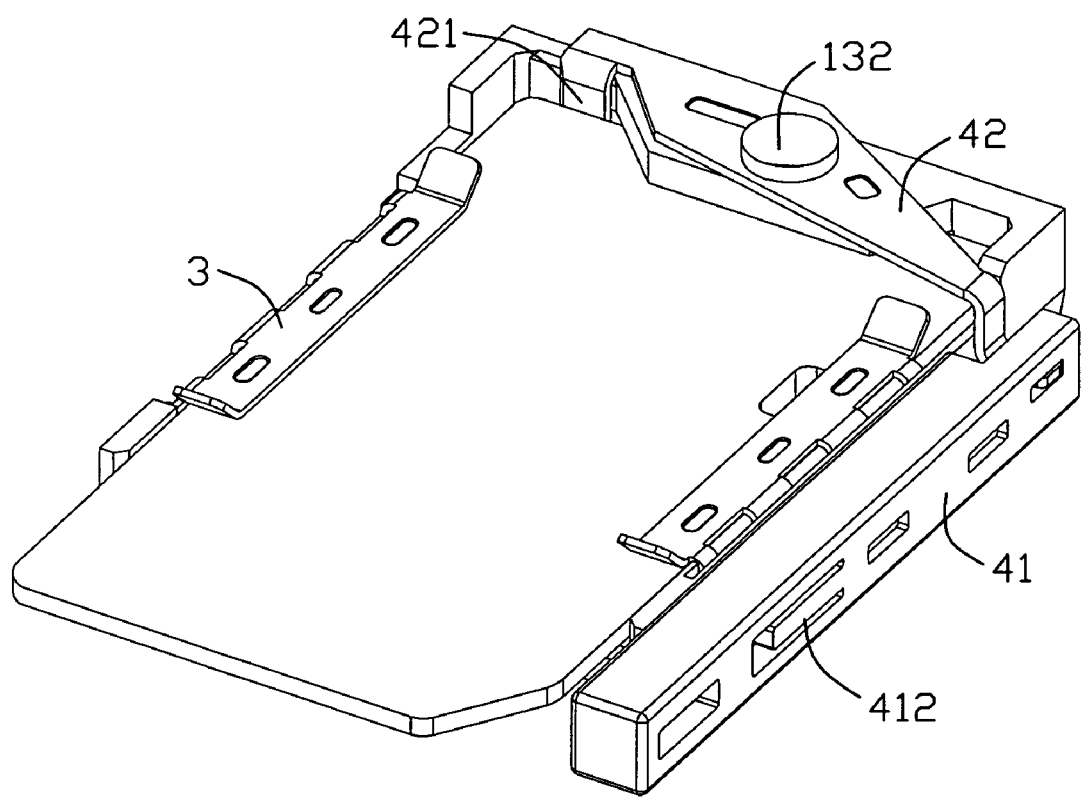
FIG. 5 is a perspective view of the card connector according to the present invention with a card is located at the receiving position.
Figure 6:
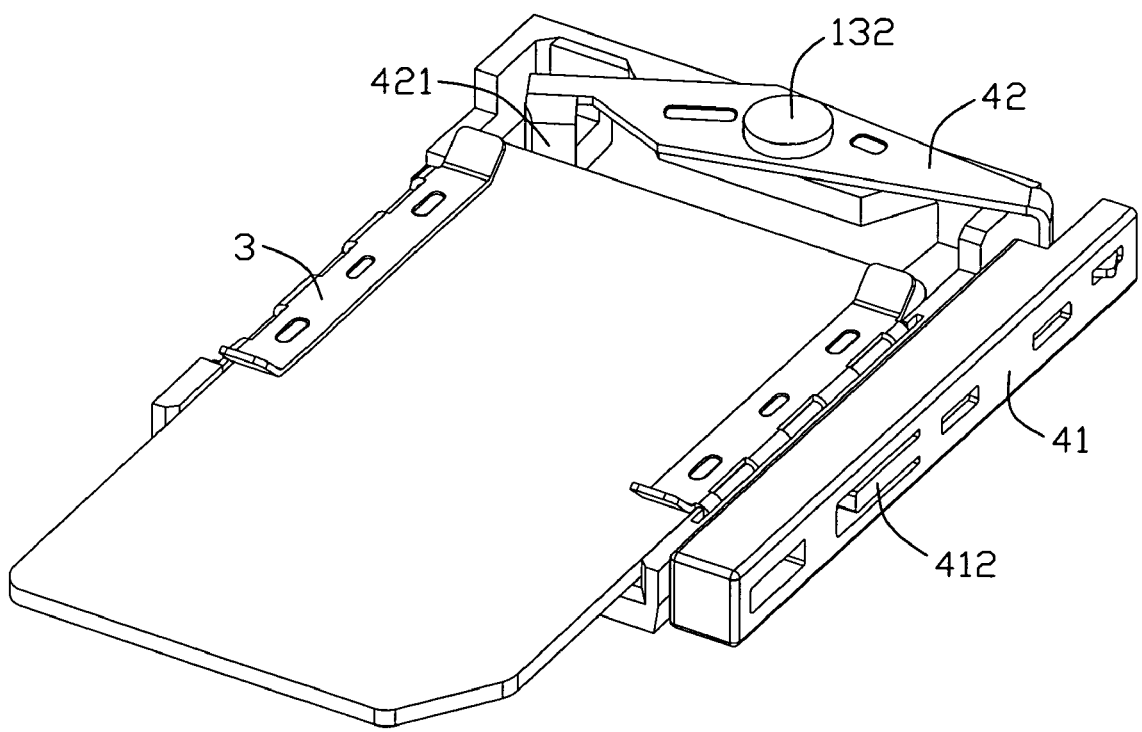
FIG. 6 is a perspective view of the card connector according to the present invention with a card is located at the ejected position.

The push bar 41 is substantially a rectangular cuboid and has a front portion 415(show in FIG. 4), the push bar is assembled to the housing after the first shell is attached to the housing. A connecting slot 414 for receiving the connecting portion 423 of the lever is formed in a rear portion of the push bar 42, a cantilever 412 is formed in the push bar 42 extending frontwardly with a convex 413 formed in an end. The convex 413 is formed in an appropriate position to be engaged into the concave 212 of the engaging portion 12 when the push bar 42 is in a card ejected position. As show in FIG. 4, the push bar 42 has a slot 410 in an internal side, a pair of keys 411 extends from two sides of the slot 410 to form a T-shaped space in the push bar 42 corresponding to engaging portion 12 of the housing 1. The engaging portion 12 of the housing 1 and the T-shaped space are designed in appropriate profile, when the concave 122 engaged into the convex 413, the front portion 415 of the push bar 42 is in touch with the engaging portion 12.

In the present invention, in the card receive position and the card ejected position, the convex 413 of ejector 4 (formed as a fixing portion) will engage with the first fixing portion 121 and a second fixing portion 122 respectively. The ejector 4 will be fixed on the card connector firmly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A card connector, comprising:
    an insulating housing with a plurality of contact receiving slots formed thereon, an engaging portion being formed on a side of the housing and having a first fixing portion and a second fixing portion;
    a plurality of terminals received in the receiving slots respectively;
    an ejector comprising a card ejecting plate assembled to the insulating housing and a push bar moveably disposed on the engaging portion of the housing and connected with the card ejecting plate, a fixing portion formed on an internal side of the push bar; and
    a pair of shells each comprising a card pressing portion, a solder portion and a connecting portion for connecting the pressing portion and the solder portion, the shells mounted to two sides of the housing, one of the shells mounted between the housing and the push bar;
    wherein the push bar drives the card ejecting plate to move between a card receiving position wherein the fixing portion is located at the first fixing portion and a card ejected position wherein the fixing portion is located at the second fixing portion.

2. The card connector as claimed in claim 1, wherein the insulative housing has an upper surface and a bottom surface, the solder portion of the shell extends into the bottom surface of the housing, the card pressing portion extending above the housing, a card receiving space being formed between the housing and the pressing portion.

3. The card connector as claimed in claim 1, wherein the housing comprises a base portion, a front sidewall extending upwardly from a front side of the base portion, a trapezoidal planar portion extending backwardly from the front sidewall, a pivotal portion being formed in the base portion, the card ejecting portion being mounted on the pivotal portion.

4. The card connector as claimed in claim 1, wherein the engaging portion is extending outwardly from a side of the housing and is formed in T-shape for the push bar to slide thereon, the first fixing portion is formed in a front end of the engaging portion and the second fixing portion is formed in a concave-shaped configuration in a side of the engaging portion.

5. The card connector as claimed in claim 4, wherein the push bar has a front portion, a connecting slot is formed in a rear portion of the push bar for receiving the connecting portion, and a cantilever is formed in the push bar and extends frontwardly to form a convex in an end thereof.

6. The card connector as claimed in claim 5, wherein the convex is engaged into the concave of the engaging portion when the push bar is in a card ejected position.

7. The card connector as claimed in claim 6, wherein the push bar has a slot in an internal side, and a pair of keys extends from two sides of the slot to form a T-shaped space in the push bar corresponding to the engaging portion of the housing.

8. The card connector as claimed in claim 7, wherein when the concave engaged into the convex, the front portion of the push bar is in touch with the engaging portion.

\* \* \* \* \*